Nov. 22, 1960

M. E. WHITENACK 2,961,165

CONDENSATE CONTROL DEVICE

Filed April 1, 1957

Inventor:
MIRL E. WHITENACK
By: Gary, Desmond & Parker
Attys.

2,961,165
CONDENSATE CONTROL DEVICE

Mirl E. Whitenack, Monroe, Wis., assignor to The Swiss Colony Inc., Monroe, Wis., a corporation of Wisconsin Filed Apr. 1, 1957, Ser. No. 649,843

2 Claims. (Cl. 236—56)

This invention relates to improvements in a condensate control device or steam trap and refers particularly to a device of the class described which exercises an extremely sensitive response to changes in temperature to substantially close the trap or increase the opening thereof.

One of the important features of the present invention resides in a rugged construction wherein the bellows thereof, or more strictly speaking, the operative control element thereof, comprises a substantially unitary part with the body of the device.

Another important feature of the present invention resides in a construction wherein the movable diaphragm thereof is reinforced against acute local distortion and wherein the stresses tending to flex said diaphragm are distributed over a wide area of the diaphragm.

A further important feature of the invention resides in the construction of a device of the class described wherein during normal operation the trap does not completely close and wherein condensate and incondensible gases in relatively small quantities continuously discharge from the trap as opposed to prior proposed devices wherein intermittent discharge of relatively large quantities of condensate with incondensible gases is interspersed with periods of complete closing of the trap.

Other objects and advantages of the present invention will be apparent from the accompanying drawing and following detailed description.

Figure 1:
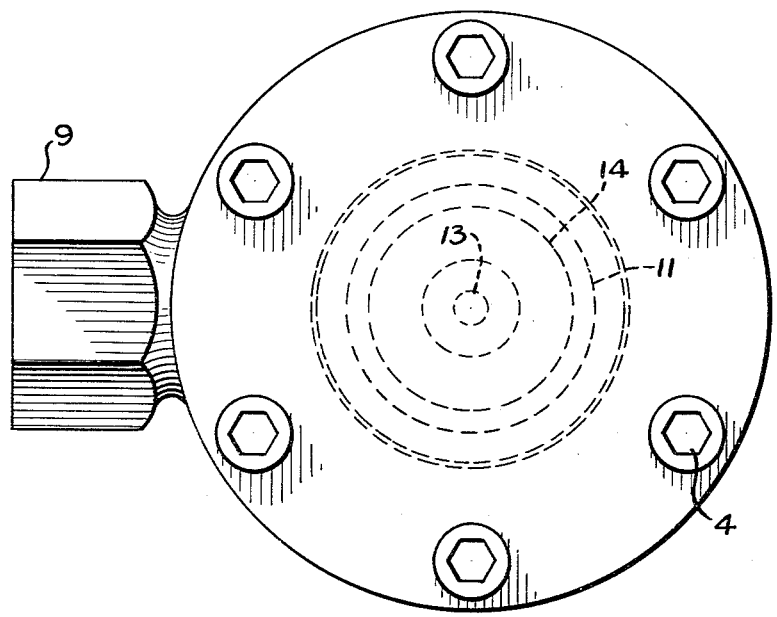
Fig. 1 is a top plan view of the improved condensate control device.

Referring in detail to the drawing, 1 indicates generally the steam trap or condensate control device embodying the present invention. The device 1 comprises essentially a body 2 and a closure or head 3, the latter being secured to the body in fluid-tight relationship by a plurality of cap screws 4. The body and closure are preferably constructed of a non-corrodible metal. A gasket 5 is interposed between the closure 3 and body 2 to effect a fluid-tight seal between the two elements.

The body 1 is provided with a recess 6 having an inlet 7 for steam and an outlet 8 for condensate, incondensible gases such as air and the like, the inlet being provided with threads 9 and the outlet carrying threads 10 whereby the device may be connected to respective pipes (not shown) of a steam system.

The inner face of the closure 3 is recessed to provide a cavity 11, the lower portion of the cavity being defined by a flexible diaphragm 12 which is preferably constructed of a metal having relatively high thermal conductivity and which may be brazed or otherwise secured at its marginal edge to the closure 3. Suitable materials for diaphragm 12 include such conventional metals as bronze, stainless steel, and copper, as well as the alloys more recently developed specifically for diaphragms. A pin 13 extends through the central portion of the diaphragm 12 into cavity 11 and within said cavity adjacent the surface of the diaphragm a plate 14 is secured to said pin. The pin 13, diaphragm 12 and plate 14 may be respectively brazed or otherwise secured as a substantially integral unit. The depending portion of pin 13 is threaded and a nut 15 confines the diaphragm against the plate 14. The specific function of nut 15 and plate 14 will be hereinafter more fully described. At the lower portion of pin 13 a plug 16 is adjustably carried, said plug being engageable with the pin threads and being locked in desired position by a set screw 17. A bushing 18 is threadedly positioned in outlet 8 and the upper edge thereof protrudes into recess 6 and forms a seat 19 for plug 16. A pin 20 extends across inlet 7 and functions as a baffle to prevent an inrushing fluid stream from impinging directly upon plug 16.

A bore 21 is provided in the closure head 3 and opens into cavity 11. A ball check valve 22 backed by set screws 23 functions to close the opposite end of bore 21.

Figure 2:
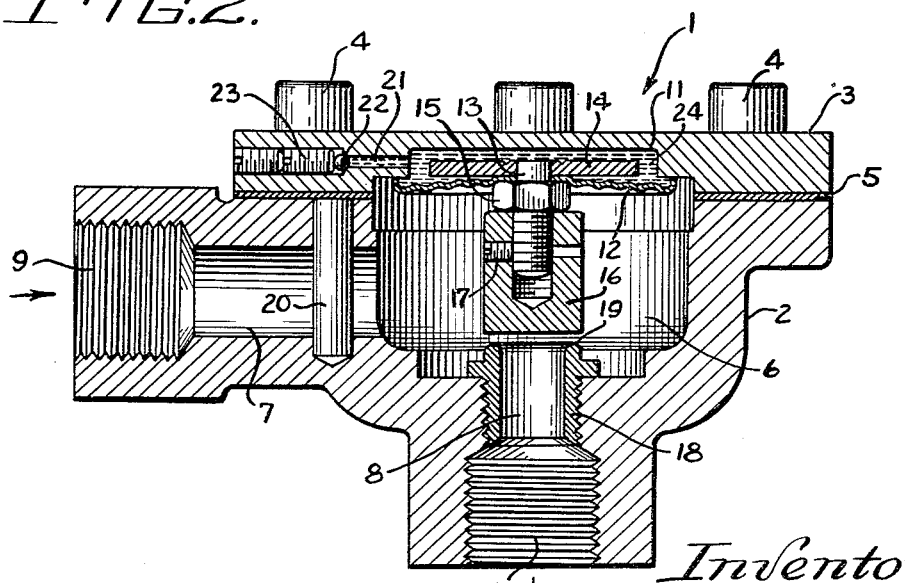
Fig. 2 is a longitudinal sectional view through the device.

To condition the device for use, with the diaphragm unflexed the lower portion of plug 16 is positioned a relatively small distance above seat 19, that is, the valve comprising plug 16 and seat 19 is slightly cracked, the distance between plug 16 and seat 19 being in the neighborhood of .090 of an inch. This constitutes the equilibrium or normal setting of the control. However, cavity 11 is initially filled with liquid 24 at room temperature and after being completely filled the liquid therein is subjected to vacuum in the neighborhood of one micron absolute. Liquid 24 in the case of a steam system may be water containing an antifreeze agent, or in other systems may be ethyl alcohol or other substance depending on the desired characteristics of operation such as temperature range. While the cavity remains filled with liquid, diaphragm 12 is drawn to a concave position, such as shown in Fig. 2, and plug 16 is spaced an appreciable distance from seat 19. In this position ball valve 22 is positioned in sealed position with respect to bore 21 by set screws 23 to maintain the liquid in the cavity under said subatmospheric pressure. At this stage recess 6 is at atmospheric pressure and temperature and the liquid 24 is at a pressure equal to atmospheric pressure minus the potential energy stored in the flexed diaphragm. In this condition the device is ready for use.

When steam is introduced through inlet 7, heat passes through diaphragm 12 to liquid 24 and inasmuch as said liquid is under subatmospheric pressure a portion of the liquid readily turns to vapor and increases the pressure within cavity 11. Diaphragm 12 is thus caused to unflex until it assumes a completely unflexed condition, that is, when the pressure within cavity 11 equals the pressure within recess 6 and at which time plug 16 is spaced a predetermined minimum distance from seat 19, as has been hereinbefore described. This is the equilibrium position at which the device is set. It will be noted that when the parts are in this position, the cavity 11 contains both liquid and vapor and, hence, any change in temperature, even though slight, will change the liquid-vapor relationship and, hence, the pressure within the cavity a relatively great degree. Hence, the control device 1 is extremely sensitive to variations in temperature to substantially close or materially open the valve comprising plug 16 upon seat 19.

One of the important features of the present invention resides in the fact that the plug 16, when the device is in preset equilibrium position, does not completely seat. During normal operation the forces acting upon opposite faces of the diaphragm act over equal areas, that is, the complete area of the top and the complete area of the bottom of the diaphragm. Moreover, were the plug to completely seat, this area relationship immediately changes. Upon the seating of plug 16, the pressure upon the upper face of the diaphragm acts over the entire area of said face, but the pressure acting upon the lower face of the diaphragm acts over the area of the lower face of the diaphragm minus the area defined by valve seat 19. Hence, it can readily be appreciated that the plug 16 would seat under one predetermined ratio of pressures in cavity 11 and recess 6 but could be opened only by a ratio wherein the pressure in recess 6 would exceed the closing pressure in recess 6 by a factor which is a function of the area defined by the seat 19.

In actual practice the spacing of plug 16 from seat 19 can be made so small when the diaphragm 12 is in its unflexed condition as to play a substantially negligible factor in the operation of the device, except as to maintaining the effective areas of the faces of the diaphragm equal. That is, a small amount of condensate and incondensibles will be continuously discharged through opening 8, as opposed to intermittent discharge of relatively larger amounts of condensate and incondensibles interspersed with periods of complete closure, as contemplated in prior art devices.

It will be noted that the cavity 11 is defined essentially by the diaphragm 12 and a relatively thin portion of the head 3. Hence, the rate of heat condensation through the thin wall is relatively high and there is continuous radiation from the top of the head 3, particularly that portion thereof in contact with the fluid 24. This prevents an accumulation of heat in the cavity 11 which, in turn, prevents a lag in the flexing of diaphragm 12 in response to temperature changes in cavity 6. Although heat transfer through the relatively thin wall referred to changes relative to ambient temperatures, such changes are substantially negligible in the operation of the device.

By the provision of plate 14 and nut 15 on opposite sides of the diaphragm, the life of the diaphragm is prolonged since the stresses in the diaphragm due to flexing and unflexing thereof are not concentrated at the juncture of pin 13 and the diaphragm but are distributed over a relatively large area of the diaphragm. Elastic fatigue of the diaphragm is thus minimized.

I claim as my invention:

1. A condensate control device which comprises a body provided with a recess having an inlet and outlet, a closure for said recess secured to said body, said closure being provided with a cavity, a flexible diaphragm constructed of a material having a relatively high thermo conductivity carried by said closure and separating said cavity from said recess, said cavity being substantially filled with liquid under subatmospheric pressure to flex said diaphragm concavely relative to said recess when the atmosphere in said recess is at atmospheric pressure and temperature, a pin carried by said diaphragm and extending through substantially the center thereof, a disc carried by said pin within said cavity, said disc having its periphery disposed adjacent the periphery of the diaphragm and being disposed in substantially plane-parallel relationship therewith when said diaphragm is unflexed, and with portions contiguous with said diaphragm, and means carried by said pin exteriorly of said recess and movable with said diaphragm to a position substantially to restrict but not close said outlet when a portion of the liquid in said cavity is converted to vapor by the introduction of hot gas to said recess to increase the pressure in said cavity and unflex said diaphragm.

2. A condensate control device which comprises a body provided with a recess having an inlet and outlet, a closure for said recess secured to said body, said closure being provided with a cavity, a flexible diaphragm constructed of a material having a relatively high thermo conductivity carried by said closure and separating said cavity from said recess, said cavity being substantially filled with liquid under subatmospheric pressure to flex said diaphragm concavely relative to said recess when the atmosphere in said recess is at atmospheric pressure and temperature, a pin carried by said diaphragm and extending through substantially the center thereof and into said cavity, a disc having an area covering the major portion of the area of the diaphragm carried by said pin within said cavity, said disc being disposed in substantially plane-parallel relationship with said diaphragm when said diaphragm is unflexed, and with portions contiguous with said diaphragm, means carried by said pin exteriorly of said recess and movable with said diaphragm to a position substantially to restrict but not close said outlet when a portion of the liquid in said cavity is converted to vapor by the introduction of hot gas to said recess to increase the pressure in said cavity and unflex said diaphragm.

References Cited in the file of this patent
UNITED STATES PATENTS

| | | |
|---|---|---|
| 208,520 | Hawes | Oct. 1, 1878 |
| 887,513 | Pearce | May 12, 1908 |
| 1,062,300 | Pierce | May 20, 1913 |
| 1,123,208 | McGuire | Dec. 29, 1914 |
| 1,271,212 | Paul | July 2, 1918 |
| 1,816,142 | Clifford | July 28, 1931 |
| 2,022,722 | Hyatt | Dec. 3, 1935 |
| 2,289,020 | Jones | July 7, 1942 |
| 2,749,046 | Schmitz | June 5, 1956 |